Patented Oct. 16, 1951

2,571,797

UNITED STATES PATENT OFFICE 2,571,797

VITAMINACEOUS OIL CONTAINING POWDERS AND THE PREPARATION THEREOF

Sidney D. Upham, Stillwater, Okla., and Charles C. Reed, Pearl River, N. Y., assignors to American Cyanamid Company, New York, N. Y., a corporation of Maine No Drawing. Application February 24, 1949, Serial No. 78,232

8 Claims. (Cl. 167—81)

This invention relates to new preparations consisting of substantially dry powders having incorporated therein a relatively large proportion of material of an oily nature, and methods of preparing such powders. More particularly the invention relates to certain materials such as the oily vitamins prepared as dry powders by adsorbing them into a magnesium or aluminum hydroxide at the time of its formation from an alcoholate whereby an oil-containing powder may be formed having a higher proportion of an oil than has been previously known, and which is an unusually stable and convenient vitamin-containing powder. Some of the magnesium or aluminum hydroxide may be dehydrated to the corresponding oxide at the time of formation or later. As one of the more useful specific examples is the formation of aluminum hydroxide from aluminum isopropoxide in the presence of oily soluble vitamins, such as A, D or E, or mixtures of them in the presence of a solvent, and the removal of the solvent whereby dry powders are formed which contain remarkably large quantities of these vitamins and in which either alone or by the admixture of antioxidants and inert oils such as cottonseed oil, the vitaminaceous powders possess an unusually great stability whereby therapeutic dosages may be prepared for use with less danger of deterioration. Accordingly, as a specific object of the invention is the preparation of a dry stable vitamin-containing powder suitable for therapeutic use.

Other objects of the invention will be obvious and appear in connection with the following description of certain details of our invention.

According to well known procedures, various aluminum hydroxides and the hydroxides of calcium, magnesium, strontium and barium, diatomaceous earths, charcoals, activated carbons, peats and other materials have been used as adsorbent mediums upon which various oils could be adsorbed, both for the preparation of an oil-containing product and for purposes of purification or separation as desired. All of these processes in the past have given oil-containing powders having a lower oil content and a lower stability than those produced by the herein described method, comprising the adsorption at the time of formation of the adsorbent.

Broadly, several different metallic alcoholates may be used. For non-therapeutic purposes such metals as calcium and iron etc. may be useful but for therapeutic purposes the alcoholates of magnesium and aluminum are the only satisfactory common metallic alcoholates because the resultant magnesium and aluminum hydroxides are readily tolerated medicinally and are in fact frequently therapeutically desirable. Among the alcoholates which may be used are the isopropoxides, normal propoxides, isobutoxides, normal butoxides, tertiary butoxides and secondary butoxides, methoxides, ethoxides, various pentoxides, benzoxides and mixtures thereof and mixtures of the aluminum and magnesium alcoholates as for example their mixed ethoxides.

The preparation of certain of the aluminum alcoholates are described in an article "Selective Activation of Alumina For Decarboxylation or Dehydration" by Homer Adkins in the Journal of the American Chemical Society, volume 44, 2175 at page 2179. Certain of these alcoholates are more desirable than others for the purposes of the present invention. The aluminum alcoholates possess an economic advantage over the magnesium alcoholates and these alcoholates in general are comparatively easy to prepare from low priced raw materials, and are soluble in benzene and certain other solvents with medium or low boiling points, such as petroleum ether, or chloroform. Certain of them are readily purified by vacuum distillation and the undesired products of hydrolysis with water are readily removable by distillation at temperatures which are low enough so as not to damage heat sensitive vitamins. Furthermore, the alcoholates are relatively stable on storage. Among the suitable ones are: Aluminum isopropoxide which melts at 118–118.5° C., is soluble in both alcohol and benzene, has a specific gravity of 1.035 and distills at about 125 to 130° C. under a vacuum of 4 to 6 mm. Aluminum propoxide which melts at 106–107° C., is soluble in benzene and distills at approximately 200° C. at 3 mm. Aluminum n-butoxide which melts at 101.5–102° C. and is soluble in benzene; aluminum isobutoxide, melting at 212–214° C. but which cannot be readily vacuum distilled; aluminum tertiary butoxide, melting at 206–207° C. is benzene soluble, but cannot be readily vacuum distilled; aluminum secondary butoxide is soluble in petroleum ether and distills at 140–150° C. at a 4 mm. vacuum; aluminum ethoxide melts at 134–135° C. and is readily soluble in benzene; aluminum isopentoxide melts at 225–230° C. but cannot be readily vacuum distilled. The aluminum alcoholate of benzyl alcohol is soluble in benzene but decomposes on vacuum distillation. The mixed ethoxide of aluminum and magnesium is soluble in benzene but cannot be readily distilled. The higher boiling alcoholates which distill at comparatively high temperature or cannot be distilled at all without decomposition are less satisfactory in that they are more expensive to prepare and more difficult to prepare pure and are more difficult to remove from the final powders if not completely decomposed.

Of the alcoholates, the aluminum isopropoxide exhibits a marked superiority because the aluminum isopropoxide itself is readily distilled and may be obtained very pure in this manner; the isopropyl alcohol obtained by the hydrolysis of the isopropoxide boils at 82.3° C. and accordingly is very easily removed at comparatively low temperatures under reduced pressure from the finished product; and the aluminum isopropoxide is soluble in benzene, chloroform, petroleum ether and many other anhydrous solvents. Further, the product obtained from aluminum isopropoxide appears to be more desirable in that it may contain more oil, and is frequently more stable than that obtained from the other alcoholates.

The metallic alcoholate is most conveniently used if dissolved in an anhydrous solvent such as one of those mentioned above, or other inert organic solvent. Benzene is particularly useful because it is readily removable from the finished product; the alcoholates are comparatively soluble therein, and as compared with petroleum ether, it is less inflammable. Aluminum isopropoxide may be dissolved in benzene to the extent of over 200 grams of the aluminum isopropoxide in 300 cc. of benzene, and form a comparatively stable solution. The aluminum isopropoxide may be dissolved either as the solid or by pouring it as a molten liquid into the benzene with stirring. The material easily forms a supercooled liquid. Solution more readily occurs if heated; and after once being dissolved the solution may be cooled to a marked degree and kept for a considerable period of time before the alcoholates precipitate out. With other alcoholates and other solvents the degree of solubility of course is different, usually lesser, but may be readily determined.

The oily material to be incorporated in the finished powder may then be added to the solution. It may be added direct, as for example, by pouring a vitamin A concentrate into the alcoholate-benzene solution, but is generally more conveniently introduced if such oily material is dissolved in and diluted with a solvent so that its viscosity is less and it may be more easily handled. For therapeutic preparations, such materials as vitamin A alcohol, vitamin A acetate or other vitamin A esters, either natural or synthetic, vitamin D or vitamin E or castor oil, sesame oil, corn oil, or other oil, either pure or mixed with each other or other oils or vitamins, may be mixed in the same solvent as that in which the alcoholate is dissolved, or a compatible solvent, and the two solutions mixed. As a matter of convenience absolute alcohol or acetone is particularly useful as a solvent for oily vitamins and is compatible with the benzene and most other solvents used for the metallic alcoholate. There is thereby obtained a clear solution containing the oily materials and the metallic alcoholate. Other materials may be incorporated at this point if desired. For certain of the vitamins, particularly the vitamin A group, it is sometimes desirable that antioxidants be added so that they are incorporated into the powder as formed. Such antioxidants as nordihydroguaiaretic acid, mixed tocopherols, ethyl hydrocaffeate, "Tenox" or "Tenox HQ" or a mixture of one or more of these and/or other antioxidants or modifiers for the particular oils used may be incorporated.

There is normally obtained thereby a clear solution. To this is added water.

In small batches the moisture of the air may be allowed to hydrolyze the metallic alcoholate. For larger quantities and where the oil may be deleteriously affected by oxygen from the air and an inert atmosphere is desired to be used, the water may be added as steam or vapor or as liquid water. A particularly convenient method of adding the water is diluted with a solvent such as acetone or alcohol containing from 10 to 60% water so that the water is in a solvent which is miscible with the main body of solvent and will thereby cause the water to more readily, efficiently, and effectively react with the metallic alcoholate so that a more intimate admixture and prompt reaction is obtained. It is preferred that the mixture be stirred continuously and vigorously while the water is being added. Heat is evolved and if the oily material is temperature sensitive, the reaction vessel should be cooled as necessary to prevent the temperature rising unduly. After sufficient water is added to completely react with the metallic alcoholate, the mixture is stirred until the reaction is complete, the temperature at all times being kept sufficiently low as to prevent damage to the oily materials, the residual solvents removed, and the dry powder recovered. The solvents may be removed from small batches by allowing the solvents to evaporate in air. With larger quantities, it is normally more convenient to remove the solvents by drying the metallic hydroxide under a comparatively high vaccum. The degree of vacuum required is of course a function of the temperature sensitivity of the oily material and varies with the rapidity with which it is desired to remove the solvent. Depending upon the conditions of hydrolysis, and method of drying, varying amounts of the metallic hydroxide may be dehydrated to the oxide. Theoretically the solvent may be slowly removed without harming the material but practically, to save time, it is usually preferable that as high a degree of vacuum as convenient and a reasonably high temperature be used. With material such as vitamin A, a temperature of 50 to 60° C. is usually convenient and safe. A vacuum of in the neighborhood of 27 inches of mercury or more, used in conjunction with a suitable condenser, permits the rapid and complete removal of the solvents as well as the alcohols produced.

The material as thus prepared as a dry powder may contain a higher fraction of its weight of oil than a powder prepared by any other presently known means. Whereas it is well known that powdered aluminum hydroxide or magnesium hydroxide will adsorb oils, the same oils mixed with a dry aluminum hydroxide, such as U. S. P. XII, will contain as a maximum less than ½ as much of the oily material as the product prepared by our method, while still remaining as dry powders. Furthermore if the oil adsorbed contains vitamins, the vitamins added to the preformed aluminum hydroxide or magnesium hydroxide appear to lose their efficiency and decompose at a higher rate than when prepared in accordance with our invention by adsorption in the hydroxide at the time of the hydroxide's formation. Aluminum isopropoxide is a reducing agent. It is inherently a protective for oxidizable materials, and traces which may remain may increase the stability of our product.

The theory as to why a product prepared in accordance with this invention should possess such marked advantages is at best a guess. The original work of Homer Adkins referred to above, discusses interstitial relationships in the crystal lattice. It may be that certain of the improved aspects of the present invention are based upon the fact that a crystal lattice is formed with the larger isopropoxide groups or other alcoholate groups, which remains after the alcoholate group is replaced by a hydroxy group and then accordingly the oil may be bound internally in this larger space as the aluminum hydroxide powder is formed. Some evidence that the oil is surrounded by the aluminum hydroxide may be found in the stability of vitamin A when incorporated in a powder in accordance with this invention as contrasted with the free vitamin A left exposed to air.

It has been found that vitamin A may be adsorbed upon the aluminum hydroxide particularly in the presence of antioxidants giving a powder of high potency and stability which may be mixed with other vitamins in capsules, pills and related vitamin products.

Vitamin A may be further protected if the powder after being formed is mixed with a small additional quantity of cottonseed oil or other bland oil, only such proportion being used as will not cause the powder to become oily. The oil seems to be adsorbed upon the surface leaving the vitamin A deeper within the particles of powder and as the net result even greater stability is obtainable.

As specific examples, certain embodiments of our invention are set forth in an illustrative sense, only, in no way to be considered as limiting, by the following examples:

Example 1

Aluminum isopropoxide prepared after the method of Adkins, J. A. C. S. 44, 2178, was distilled under reduced vacuum at a temperature of from 125 to 130° C. at a pressure of 4 to 6 mm. The material was collected, kept dry and allowed to solidify. 1000 grams of the dry aluminum isopropoxide was dissolved in 1200 cc. of anhydrous benzene by warming with continual stirring in a double arm type of mixing kettle equipped with a heating jacket and a cover. After a clear solution was obtained, the kettle was cooled and a few small pieces of Dry Ice were added so as to fill the kettle completely with carbon dioxide and give a protective atmosphere. 500 grams of vitamin A acetate containing one million units per gram in cottonseed oil was mixed with an equal volume of benzene and added to the reaction kettle, being protected by an inert atmosphere of carbon dioxide while the addition was taking place. The mixture was stirred until homogeneous. ½ gram of nordihydroguaiaretic acid dissolved in 20 cc. of absolute alcohol was added and the mixture again stirred for 10 minutes. 280 grams of water mixed with ⅓ of its volume of ethyl alcohol was added in a slow stream over a period of 30 minutes. During this time the vessel was cooled so that the temperature did not rise above 50° C., the mixture being constantly agitated to insure that there was thorough mixing and that any solids formed were kept in a finely divided state. At the end of 30 minutes the mixture was uniform, thick and an opaque white.

A vacuum of at least 27 inches of mercury was applied to the system, the temperature of the kettle raised to 70° C., and the solvents condensed as they distilled over. The alcohols may be dissolved from the benzene and the benzene recovered by washing with water. As a matter of convenience but not necessity, the mixers in the kettle were kept running during the distillation and the vacuum and temperature kept applied for a period of 3 hours, during the last of which the condenser was cut out of the system. The kettle was then cooled by running cold water through the jacket and the vacuum broken by filling the kettle with carbon dioxide. There was obtained thereby a homogeneous dry fairly fine powder which was run through a grinder and screened through a fine screen, yielding a fine dry slightly yellowish powder with a slight ester-like odor containing all of the original vitamin A activity therein. The material may be stored in an inert atmosphere for prolonged periods without substantial decomposition.

Example 2

200 grams of the aluminum isopropoxide was dissolved in 300 cc. of benzene in a kettle with a cooling and heating jacket, stirrer, and manometer, was thoroughly mixed and brought to a temperature of approximately 36° C. The mixture was flushed with nitrogen and a slight pressure of nitrogen kept on the system until vacuum was applied for the vacuum distillation. 100 grams of commercial vitamin A acetate was dissolved in 150 cc. of benzene in an atmosphere of nitrogen. The solution containing the vitamin A was then poured into the aluminum isopropoxide-benzene solution with stirring. A theoretical quantity of a mixture of acetone and water containing approximately 10% water was added thereto with stirring until all of the aluminum isopropoxide was reacted to aluminum hydroxide, over a period of two hours, the temperature being kept at 36° C. A vacuum was then applied sufficient to remove all of the organic solvents, at a temperature not in excess of 50° C. The system was then filled with nitrogen. The product obtained was a dry light yellowy free-flowing powder, homogeneous, with a slight ester-like odor. 176 grams of product was obtained.

Example 3

220 grams of redistilled aluminum isopropoxide was dissolved in 350 cc. of benzene on a steam bath. 100 grams of vitamin A acetate sold as "Myvax" by Distillation Products, Inc., and containing a labelled claim of 1,000,000 units per gram, the remainder being cottonseed oil, was dissolved in 150 cc. of benzene and added to the aluminum isopropoxide-benzene mixture under the nitrogen atmosphere. Thereto was added as antioxidants 0.1 gram of the antioxidant known as "Tenox 1" and 0.1 gram of "Tenox HQ," dissolved in 55 cc. of ethyl alcohol. Stirring was continued for 15 minutes. There was then slowly added 60 cc. of distilled water mixed with 55 cc. of ethyl alcohol, while the mixture was kept cool by the use of an ice bath and protected from air by the use of nitrogen. After the addition over a period of 20 minutes, the mixture was stirred for an additional 20 minutes, then connected to a vacuum. The ice bath was replaced by a water bath at 50° C. and all of the liquids removed over a period of 6 hours using a water aspirator for vacuum. The container was filled with nitrogen, the powder scraped and crushed into a porcelain dish and dried in 30 inches of vacuum at room temperature for an additional four hours. After screening through a 60 mesh screen there was obtained 188 grams of a fine dry yellow powder assaying 580,000 units per gram. To this powder was added 13 grams of cottonseed oil with stirring to give a total yield of 200 grams of a fine dry powder. The use of the antioxidants mixed into the powder at the time of its formation and the coating with cottonseed oil gives a product of increased stability.

Example 4

To 75 cc. of benzene in a 3-neck flask, was added 20 grams of molten aluminum isopropoxide. The flask was connected to a nitrogen tank and fitted with a stirrer. Thereto was added 10 grams of a vitamin A concentrate containing 900,000 units per gram dissolved in 25 cc. of benzene having added thereto 0.01 gram of tocopherols and 0.01 gram of ethyl hydrocaffeate. Nitrogen was flushed into the isopropoxide solution as the vitamin A solution was added thereto; 56 cc. of a mixture containing 90% acetone and 10% water was added slowly with stirring, care being taken to keep the temperature below 50° C. After thorough mixing, the flask was connected to a water aspirator and the benzene taken off at a temperature of approximately 50° C. The powder obtained was dried at 27° under vacuum at room temperature for two hours obtaining thereby a fine dry light yellow powder analyzing 500,000 units per gram.

Example 5

To 600 cc. of warm benzene there was added 45 grams of solid aluminum isopropoxide, and after solution, there was added thereto 15 grams of castor oil dissolved in 100 cc. of benzene. The benzene was allowed to evaporate in an open porcelain dish, the moisture in the air decomposing the aluminum isopropoxide. After several days, the powder obtained thereby was dried under vacuum at 60° C. for two hours. There was obtained 32.5 grams of powder containing 46% of castor oil by weight.

Example 6

300 grams of molten aluminum isopropoxide was dissolved in 350 cc. of benzene, then cooled to room temperature. A mixture of 37.2 grams of vitamin A acetate containing 1,300,000 units per gram and 74 grams of mixed tocopherols, commercially classed as type 4, containing the equivalent of 34% pure tocopherols, in 250 cc. of benzene was added to the isopropoxide solution, the mixture was poured with stirring into an enamel pan containing 100 cc. of water, then dried in a vacuum oven at 70° for two hours. The temperature of the oven was lowered to room temperature, the vacuum was broken with nitrogen, the product removed, powdered and returned to the oven for an additional two hours under vacuum at 70° C. The product was screened through a No. 00 screen, yielding 240 grams of fine homogeneous dry powder analyzing 198,000 units per gram of vitamin A and 30% by weight of the 34% mixed tocopherols.

Example 7

300 grams of molten aluminum isopropoxide was mixed with 300 cc. of benzene. 100 grams of mixed commercial tocopherols, analyzing 34% tocopherols, was dissolved in 200 cc. of benzene and added with stirring to the aluminum isopropoxide solution. The mixture was poured into an open enamel pan containing 85 cc. of distilled water with stirring, then dried at 27 inches of mercury vacuum at 70° C. for two hours. The vacuum was broken, the mixture ground with a spatula, re-dried, then screened. There was obtained thereby a yield of 233 grams of a mixture analyzing 38.6% of 34% mixed tocopherols.

Example 8

To 1 gram of aluminum tertiary butoxide dissolved in 50 cc. of benzene was added 1 gram of a commercial vitamin A alcohol containing 700,000 units per gram. After stirring the mixture was allowed to evaporate by exposure to room conditions. The benzene and alcohol evaporated as moisture was obtained from the air yielding a dark yellow dry powder with an odor of vitamin A alcohol which assayed 152,000 units per gram.

Example 9

One gram of aluminum secondary butoxide was dissolved in 40 cc. of petroleum ether (30 to 60° C.); and thereto added one gram of vitamin A alcohol dissolved in 20 cc. of petroleum ether. After mixing, the solution was allowed to evaporate in an open porcelain dish under room conditions and there was obtained thereby a fine dry light yellow powder.

Example 10

2700 grams of aluminum isopropoxide in the molten form, was poured into 4 liters of benzene, stirred and cooled to a temperature of 36° C. 900 grams of 34% mixed tocopherols were dissolved in 1400 cc. of benzene and added thereto with mixing. A clear transparent solution resulted. After 15 minutes, a mixture of 714 cc. each of alcohol and distilled water were added with stirring over a period of 20 minutes, the mixture allowed to stand at a temperature of not more than 50° C. for an additional 15 minutes. The solvents and water were distilled off at a temperature of not over 50° C. under a vacuum of 25 inches of mercury for a period of four hours. The product was screened and again dried at 50° C. under vacuum for 12 hours. There was obtained a yield of 2020 grams containing essentially all of the activity of the original tocopherols.

Example 11

10 grams of 34% mixed tocopherols dissolved in 100 cc. of benzene was added with stirring to a solution of 20 grams of aluminum isopropoxide dissolved in 100 cc. of benzene. The mixture was vigorously stirred while adding thereto 6 cc. of water and the stirring continued for 30 minutes, yielding a complete homogeneous viscous liquid. The mixture was evaporated at 90° C. and 27 inches of mercury vacuum for 2½ hours. 15 grams of a dry dusty powder was obtained containing 56% of 34% mixed tocopherols.

Example 12

An additional sample was run under the conditions of the preceding example except that only 15 grams of aluminum isopropoxide were used. There was obtained a dusty light yellow fine powder which was a trace waxy containing 63% of 34% mixed tocopherols, a total yield of 12.5 grams being obtained.

Example 13

The crude reaction product containing magnesium aluminum isopropoxide, which cannot be distilled, was purified by dissolving the crude reaction product in benzene and filtered through a sintered glass funnel. 100 cc. of benzene containing 14 grams of magnesium aluminum isopropoxide was added to a solution containing 7 grams of vitamin A acetate, commercial, in 50 cc. of benzene. After evaporation of the benzene under room conditions, the powder was put into a humidity chamber for 20 minutes to assure complete conversion of the isopropoxide into aluminum and magnesium hydroxide. The material was then dried under vacuum at 60° for one hour, and thereby obtained a light yellow, fine powder assaying 144,000 units per gram of vitamin A.

Example 14

To 12 grams of magnesium turnings in a 500 cc. round bottom flask was added 0.5 gram of mercuric chloride and 150 cc. of absolute methanol. The mixture was connected with a reflux condenser and cooled by ice for the first 15 minutes to keep the reaction from becoming too violent. As the reaction moderated, the mixture was allowed to warm up to room temperature and stand for 4 hours. The mixture was diluted to 390 cc. with benzene and filtered through a sintered glass funnel.

To 98.4 cc. of the magnesium methoxide in the benzene methanol solution, containing approximately 10.8 grams of magnesium methoxide was added 4 grams of vitamin A acetate, commercially labelled as 686,000 units per gram, dissolved in 50 cc. of benzene. The mixture was stirred in a 600 milliliter beaker at high speed while adding 4.5 cc. of distilled water. The stirring was continued for 15 minutes at which time the mixture was a uniform viscous gel. The gel was transferred to an open porecelain evaporating dish and allowed to stand under room conditions, being occasionally agitated by a spatula, and having a current of air directed on it by an electric fan until the mixture appeared to be completely free from solvent and hydrolyzed. Approximately 2 hours were required. The resulting powder was dried in a vacuum oven at room temperature for 3 hours. After screening through an 80 mesh sieve, a fine, dusty, dry, brownish powder was obtained assaying 131,000 units per gram of vitamin A. A yield of 10.69 grams of product was obtained.

The product as produced by this invention is such that it stores vitamin A or other oily material, but when ingested, the material is readily free and is biologically available.

Under various conditions, depending upon the temperature of reaction and the relative proportions, the final product may contain a certain amount of the metallic oxide rather than entirely aluminum or magnesium hydroxide. When prepared in accordance with the methods above described, a major portion is present as the hydroxide and under any conditions whether the material contains a larger or a lesser amount of the magnesium or aluminum oxide, or a complex of oxide and hydroxide, the final product is a substantially stable, substantially dry, desirable, therapeutic product. It is obvious that the above description is intended to be illustrative only and that the process may be varied or modified to a considerable extent within the skill of those in the art without departing from the spirit of this, our invention.

We claim:

1. A process for the production of a substantially dry and stable vitaminaceous powder which comprises contacting a vitaminaceous oil with aluminum isopropoxide in an inert solvent, hydrolyzing the aluminum isopropoxide by treatment with water, and removing the solvent and other volatile liquids at a temperature range within which the vitaminaceous material is stable.

2. A process for the production of a substantially dry and stable vitamin A containing powder which comprises dissolving aluminum isopropoxide in benzene, adding vitamin A thereto, mixing until substantially homogeneous, decomposing the aluminum isopropoxide by the addition of water, and removing the solvent and other volatile liquids at a temperature range within which vitamin A is stable, thereby obtaining the desired substantially dry powder.

3. A process for the production of a substantially dry and stable vitamin A-containing powder which comprises dissolving aluminum isopropoxide in a solvent therefor, adding a vitamin A composition thereto, mixing until substantially homogeneous, decomposing the aluminum isopropoxide by the addition of water in a solvent for the water compatible with the prior said solvent, removing all solvents and other volatile materials at a temperature range within which the vitamin A is stable, comminuting the product and adding thereto a protective oil in a sufficient quantity to protect the vitaminaceous material against decomposition, but still leave the powder in a substantially dry form.

4. A process for the production of a substantially stable dry powder having incorporated therein a larger proportion of vitaminaceous oily material than would be absorbed while remaining dry by an hydroxide of a metal of the group consisting of aluminum and magnesium, which comprises contacting a vitaminaceous oily material in an inert solvent with an alcoholate of a metal of the group consisting of aluminum and magnesium, hydrolyzing the alcoholate, removing the solvent, and recovering the thus produced powder having incorporated therein the vitaminaceous oil.

5. A process for the production of a substantially stable dry powder having incorporated therein a larger proportion of vitaminaceous oily material than would be absorbed while remaining dry by aluminum hydroxide, which comprises contacting a vitaminaceous oily material in an inert solvent with aluminum alcoholate, hydrolyzing the alcoholate, removing the solvent, and recovering the thus produced powder having incorporated therein the vitaminaceous oil.

6. A process for the production of a substantially stable dry powder having incorporated therein a larger proportion of vitaminaceous oily material than would be absorbed while remaining dry by magnesium hydroxide, which comprises contacting a vitaminaceous oily material in an inert solvent with magnesium alcoholate, hydrolyzing the alcoholate, removing the solvent, and recovering the thus produced powder having incorporated therein the vitaminaceous oil.

7. A substantially dry powder produced by the reaction of aluminum isopropoxide and water in the presence of a vitaminaceous oil in an inert solvent, followed by the removal of said solvent at a temperature range within which the vitaminaceous material is stable, said powder having incorporated therein at least about 30% by weight of said vitaminaceous oil.

8. A fine, dry, yellow powder comprising aluminum hydroxide having present therein at least about 500,000 units per gram of vitamin A produced by the reaction of aluminum isopropoxide and water in the presence of vitamin A in an inert solvent, followed by the removal of said solvent at a temperature range within which the vitamin A is stable.

SIDNEY D. UPHAM.
CHARLES C. REED.

REFERENCES CITED

The following references are of record in the file of this patent:

UNITED STATES PATENTS

| Number | Name | Date |
|---|---|---|
| 1,612,744 | Rast | Dec. 28, 1926 |
| 2,038,694 | Wiggins | Apr. 28, 1936 |
| 2,269,059 | McLachlan | Jan. 6, 1942 |
| 2,323,432 | Walton | July 6, 1944 |
| 2,459,903 | Voorhees | Jan. 25, 1949 |

OTHER REFERENCES

Karrer: Organic Chemistry, 2d. English ed. (1946), page 82. (Copy in Div. 43.)